(12) United States Patent
Poe et al.

(10) Patent No.: US 8,342,492 B2
(45) Date of Patent: Jan. 1, 2013

(54) DEVICES FOR REDUCING OR ELIMINATING DEFECTS IN POLYMER WORKPIECES

(75) Inventors: Garrett D. Poe, Madison, AL (US); Brian G. Patrick, Madison, AL (US)

(73) Assignee: Nexolve Corporation, Huntsville, AL (US)

( * ) Notice: Subject to any disclaimer, the term of this patent is extended or adjusted under 35 U.S.C. 154(b) by 780 days.

(21) Appl. No.: 11/844,772

(22) Filed: Aug. 24, 2007

(65) Prior Publication Data

US 2009/0050780 A1    Feb. 26, 2009

(51) Int. Cl.
*B23Q 1/00* (2006.01)

(52) U.S. Cl. ............ 269/46; 248/200; 248/300; 482/27; 482/123; 269/903

(58) Field of Classification Search ............ 482/27–29, 482/123–129; 248/200, 300, 201, 213.2; 269/903, 46

See application file for complete search history.

(56) References Cited

U.S. PATENT DOCUMENTS

| | | | | |
|---|---|---|---|---|
| 1,975,303 A * | 10/1934 | Walker et al. | ............... | 248/125.1 |
| 2,598,502 A * | 5/1952 | Butler | ............... | 211/101 |
| 2,809,383 A * | 10/1957 | Fenner et al. | ............... | 482/28 |
| 2,873,474 A * | 2/1959 | Shields et al. | ............... | 425/383 |
| 2,918,696 A | 12/1959 | Bottoms | | |
| 2,933,759 A | 4/1960 | Startzell | | |
| RE24,978 E | 5/1961 | Bottoms | | |
| 3,477,676 A * | 11/1969 | Moore | ............... | 248/201 |
| 3,849,859 A * | 11/1974 | Burkin et al. | ............... | 269/329 |
| 3,892,403 A * | 7/1975 | Green | ............... | 482/27 |
| 4,037,835 A * | 7/1977 | Forsyth | ............... | 482/27 |
| 4,214,748 A * | 7/1980 | Blackmon | ............... | 482/123 |
| 4,591,121 A * | 5/1986 | Doyle | ............... | 248/201 |
| 4,757,723 A * | 7/1988 | Carson | ............... | 74/89.2 |
| 5,207,963 A | 5/1993 | Grace | | |
| 5,321,109 A | 6/1994 | Bosse | | |
| 5,330,401 A * | 7/1994 | Walstead | ............... | 482/54 |
| 5,468,138 A | 11/1995 | Bosse | | |
| 5,506,311 A * | 4/1996 | Tamai et al. | ............... | 525/436 |
| 5,512,229 A | 4/1996 | Bosse | | |
| 5,518,550 A * | 5/1996 | Korenaga et al. | ............... | 118/729 |
| 5,552,006 A | 9/1996 | Soliday | | |
| 5,562,799 A * | 10/1996 | Ross et al. | ............... | 156/567 |
| 5,694,513 A * | 12/1997 | Okaniwa | ............... | 385/143 |
| 5,734,008 A * | 3/1998 | Shirasaki et al. | ............... | 528/353 |
| 5,947,870 A * | 9/1999 | Hall et al. | ............... | 482/27 |
| 6,237,169 B1 * | 5/2001 | Ying | ............... | 5/111 |

(Continued)

FOREIGN PATENT DOCUMENTS

FR    2684882 A1 *    6/1993

*Primary Examiner* — George Nguyen
(74) *Attorney, Agent, or Firm* — Thomas G. Peterson; Nicholas J. Landau; Bradley Arant Boult Cummings LLP (57) ABSTRACT

The present disclosure provides a novel suspension device used in producing a composition, such as, but not limited to, a polyimide composition. The suspension device in its most general form comprises a support element and an attachment element. The attachment element is in communication at one of its ends with the support element and at the other with a workpiece, such as a poly(amic acid) or polyimide workpiece. The suspension device may further comprise additional elements. The suspension device maintains the workpiece in a suspended state during processing so as to reduce or eliminate processing-related defects.

22 Claims, 4 Drawing Sheets

U.S. PATENT DOCUMENTS

| | | | |
|---|---|---|---|
| 6,733,420 B1 * | 5/2004 | Schroeder | 482/27 |
| 6,783,483 B1 * | 8/2004 | Liga, Jr. | 482/130 |
| 6,808,665 B1 | 10/2004 | Percival | |
| 6,848,148 B2 * | 2/2005 | Braid et al. | 16/197 |
| 7,018,322 B1 * | 3/2006 | Carter | 482/27 |
| 7,060,001 B2 * | 6/2006 | Publicover | 482/27 |
| 7,066,433 B2 * | 6/2006 | Oddsen, Jr. | 248/200 |
| 7,628,731 B2 * | 12/2009 | McGee et al. | 482/27 |
| 7,785,517 B2 * | 8/2010 | Poe et al. | 264/291 |
| 2005/0053789 A1 | 3/2005 | Percival | |
| 2006/0116242 A1 * | 6/2006 | Publicover | 482/27 |
| 2006/0148620 A1 * | 7/2006 | Publicover | 482/27 |

\* cited by examiner

DEVICES FOR REDUCING OR ELIMINATING DEFECTS IN POLYMER WORKPIECES

FIELD OF THE DISCLOSURE

The present disclosure relates generally to devices for reducing or eliminating defects in workpieces and/or compositions, such as polymer workpieces and/or compositions, including, but not limited to, polyimide workpieces and/or compositions.

BACKGROUND

The art is aware that a number of commercially useful compositions are used to produce various workpieces by inducing a transformation in the composition at some point in the production of workpiece for use. In many cases, such a transformation involves subjecting the composition/workpiece to conditions that can cause processing-related defects in the composition and/or the workpiece produced. If the manufacturing process is not properly controlled, such processing-related defects can prevent the workpiece from being economically or effectively produced and/or can introduce defects into the workpiece. This is especially true in the field of chemical compositions, where the transformation steps often involve removal of significant amounts of solvent and/or changes that induce conformational changes in the composition during the transformation. Poly(amic acid) and polyimide compositions are exemplary of this phenomenon. The workpiece can take on a variety of forms, such as a film, membrane or three-dimensional shape.

Polyimides are an important class of polymeric materials and are known for their superior performance characteristics. Most polyimides are comprised of relatively rigid molecular structures with aromatic/cyclic moieties and exhibit high glass transition temperatures, good mechanical strength, high Young's modulus, and excellent thermo-oxidative stability. Furthermore, the linearity and stiffness of the cyclic/aromatic backbone reduce segmental rotation and allow for molecular ordering which results in lower coefficients of thermal expansion (CTE) than those thermoplastic polymers having more flexible chains. In addition, the intermolecular associations of polyimide chains provide resistance to most solvents.

As a result of their favorable characteristics, polyimide compositions have become widely used in the aerospace industry, the electronics industry and the telecommunications industry. In the electronics industry, polyimide compositions are used in applications such as forming protective and stress buffer coatings for semiconductors, dielectric layers for multilayer integrated circuits and multi-chip modules, high temperature solder masks, bonding layers for multilayer circuits, final passivating coatings on electronic devices, and the like. In addition, polyimide compositions may form dielectric films in electrical and electronic devices such as motors, capacitors, semiconductors, printed circuit boards and other packaging structures. Polyimide compositions may also serve as an interlayer dielectric in both semiconductors and thin film multichip modules. The low dielectric constant, low stress, high modulus, and inherent ductility of polyimide compositions make them well suited for these multiple layer applications. Other uses for polyimide compositions include alignment and/or dielectric layers for displays, and as a structural layer in micromachining applications.

Furthermore, in the aerospace industry, polyimide compositions are used for optical applications as membrane reflectors and the like. In application, a polyimide composition is secured by a metal (often aluminum, copper, or stainless steel) or composite (often graphite/epoxy or fiberglass) mounting ring that secures the border of the polyimide compositions. Such optical applications may be used in space, where the polyimide compositions and the mounting ring are subject to repeated and drastic heating and cooling cycles in orbit as the structure is exposed to alternating periods of sunlight and shade.

Polyimide compositions may be synthesized by a number of methods that are known in the art. Exemplary of such methods is the traditional two-step method of synthesizing polyimide compositions, in which a solution of the aromatic diamine in a polar solvent, such as, but not limited to, N-methylpyrrolidone (NMP), is prepared. To this solution a tetracarboxylic acid, usually in the form of a dianhydride, is added. The diamine and the tetracarboxylic acid are generally added in a 1:1 molar stoichiometry, although other stoichiometries may be used. The resulting polycondensation reaction forms a poly(amic acid). The high molecular weight poly(amic acid) acid produced is soluble in the reaction solvent and, therefore, the solution may be cast into a film on a suitable substrate, such as by spin casting, or processed in other ways to produce the final polyimide composition. One common form of polyimide compositions is a polyimide film or membrane. The polyimide film may be produced by casting the soluble poly(amic acid) produced onto a substrate. The cast film is then further processed to remove the solvent and/or to convert the amic acid functional groups to imides with a cyclodehydration reaction, also called imidization.

Several methods are known in the prior art for accomplishing the imidization reaction. In one method, the cast film is heated, generally in stages, to elevated temperatures to remove solvent and accomplish imidization. Alternatively, some poly(amic acids) may be converted in solution to soluble polyimides by using a chemical dehydrating agent, catalyst, and/or heat. Other methods may also be used in certain cases.

During the imidization process, the amic acid functional groups on the poly(amic acid) undergo a chemical conversion to the imide groups in the polyimide. This conversion can impact the nature of the polyimide compositions. Poly(amic acid) compositions have more conformational freedom than their corresponding polyimide compositions. Therefore, during imidization, the conformational freedom of the constituents of the polyimide compositions is reduced. In addition, significant quantities of solvent may also be removed which can cause a reduction in conformational freedom and reduction in volume of the resulting compositions. In certain cases, soluble polyimide compositions may also be used to prepare a polyimide workpiece, such as a polyimide film. The polyimide film may be produced by casting the soluble polyimide onto a substrate. The cast film is then further processed to remove the solvent. During processing, the solvent removal causes a significant stress to accumulate as discussed above.

These changes, either alone or in combination with each other and/or other factors, causes a significant stress to accumulate in the produced polyimide compositions. The amount of accumulated stress is dependent in part on the chemical characteristics of the poly(amic acid) and the resulting polyimide compositions, on the amount of solvent present in the poly(amic acid) solution, the amount of solvent removed during processing and on the physical characteristics of the resulting polyimide compositions, such as but not limited to, size and thickness. For rigid, low CTE polyimide compositions, the difference in conformational freedom is quite significant. As a general rule, the lower the CTE of the polyimide compositions within a copolymer family, the more stress buildup occurs during further processing.

In traditional methods of casting polymer compositions (including films), such as but not limited to polyimide compositions, the poly(amic acid) solution is in contact with the substrate on which the poly(amic acid) solution is cast and is not capable of sufficient movement to release the accumulated stress as the imidization and/or solvent removal processes occurs. As such, as the poly(amic acid) compositions undergo the conformational changes as a result of imidization and/or solvent removal, the forming polyimide compositions are unable to release such accumulated stress without damaging the final product (i.e., the workpiece). The release of accumulated stress is a particular problem with polymer compositions, such as but not limited to, polyimide compositions, having a thickness of about 0.8 mils or greater.

A number of methods have been used to address the issue of substrate adherence in relation to polyimide compositions. For example, release interface agents have been used. The release interface agents are applied to the substrate prior to the addition of the polyimide or poly(amic acid) solution. The release interface agents thereby form a layer between the polyimide or poly(amic acid) solution and the substrate. While effective at providing enhanced release from the substrate, in many cases the release interface agent transfers to the final workpiece producing a workpiece that is hazy or cloudy (such modifications may result in the workpiece being unsuitable for use). Additionally, in many cases, use of the release interface agents results in polyimide films that self-release from the substrate during cure due to the stress accumulation. In many cases, this self-release phenomenon is not desirable and results in the deformation of the workpiece.

The accumulated stress may result in processing-related defects in the final polymer workpiece as discussed. Such processing-related defects include, but are not limited to, cracking, tearing, curling, warping, and mechanical anisotropy (having properties that differ according to the direction of measurement). Such processing-related defects can render the polymer workpiece unsuitable for the use for which it was originally intended.

While the discussion and examples of the present disclosure center on poly(amic acid) and/or polyimide compositions and the problems associated with manufacturing poly (amic acid) and/or polyimide workpieces, similar problems are known in the manufacture of other compositions, in particular, chemical compositions and polymer compositions, and the teachings of the present disclosure should not be limited to polyimide compositions.

Therefore, the art is lacking a device for the preparation of compositions and/or workpieces, such as, but not limited to, poly(amic acid)/polyimide compositions and/or workpieces, that addresses the problems noted in the art. The present disclosure provides a novel suspension device useful in preparing a variety of compositions and/or workpieces, such as, but not limited to, poly(amic acid)/polyimide compositions and/or workpieces, that addresses the problems of processing-related defects, such as, but not limited to, in the case of poly(amic acid)/polyimide compositions and/or workpieces, transformation-related defects and substrate retention-related defects. As a result, the use of the devices of the present disclosure provides compositions and/or workpieces that show reduced processing-related defects, are more consistent in chemical and physical properties and are cheaper and more economical to produce (since less product is rejected as unsuitable). Furthermore, the use of the devices of the present disclosure allows a wider variety of compositions and/or workpieces to be produced using a wider variety of starting materials. With reference to poly(amic acid)/polyimide compositions and/or workpieces, the present disclosure allows a wider variety of polyimide and poly(amic acid) solutions to be utilized and a corresponding wider variety of polyimide compositions to be produced.

DETAILED DESCRIPTION

Definitions

As used herein, the term "processing-related defect" means any defect that results, in whole or in part, from the processing of a workpiece from a first form to a second form; in a specific case when the workpiece is a polyimide or poly(amic acid) workpiece and processing-related defects include, but are not limited to, transformation-related defects and substrate retention-related defects.

As used herein, the term "transformation-related defect" means any defect that results, in whole or in part, from reductions in conformational freedom of one or more components of the workpiece associated with the processing of the workpiece; in the cases where the workpiece is a polyimide or poly(amic acid) workpiece, such reductions in conformational freedom may be due, in whole or in part, to the imidization process and/or the solvent removal process. Manifestations of a transformation related defect include, but are not limited to cracking, tearing, curling, warping, and mechanical anisotropy of the workpiece.

As used herein, the term "substrate retention-related defects" means any defect that results, in whole or in part, from removing a workpiece from a substrate and/or the use of release interface agents with a workpiece; manifestations of substrate retention related defects include, but are not limited to, cracking and tearing of the workpiece, inability to remove the workpiece from the substrate, and defects associated with ancillary agents used to aid in the removal of the workpiece from the substrate, such as, but not limited to, haziness, cloudiness, and product deformation.

As used herein, the term "thick" when used in reference to the thickness of a polymer composition and/or workpiece means, unless explicitly stated otherwise herein, a film having a thickness of about 0.8 mils or greater.

As used herein, the term "thickness" means the dimension through an object from one side to another, as opposed to its length or width.

As used herein the term "approximately" or "about" in reference to a number is taken to include numbers that fall within a range of 5% in either direction of (i.e., greater than or less than) the number unless otherwise stated or otherwise evident from the context (except where such number would exceed 100% of a possible value).

As used herein, the term "suspended", "suspending" or "suspension" in reference to a composition and/or workpiece, such as a poly(amic acid)/polyimide composition and/or workpiece, means that the workpiece is not in contact with an object on any of its surfaces except as may be required for being secured to a suspension device.

Suspension Device

The present disclosure provides for a suspension device for suspending a workpiece, such as, but not limited to, a poly (amic acid) and/or polyimide workpiece. In one embodiment, the workpiece is a poly(amic acid) and/or polyimide workpiece. In this embodiment, the workpiece may be any poly (amic acid) or polyimide composition known in the art; in a particular embodiment, the workpiece is made from a poly (amic acid)/polyimide composition as described in PCT Application No. PCT/US06/29805 or co-pending application Ser. No. 11/844,859 by the same inventors filed Aug. 24, 2007. The discussion below refers to the workpiece as being a polyimide or poly(amic acid) workpiece. However, the breadth of the disclosure should not be limited to such a workpiece as other polymer workpieces or non-polymer based workpieces may be used with the disclosed suspension device.

The suspension device may be adapted for use in a continuous mode or a batch mode as desired by the user.

In one embodiment, the suspension device is used in a batch mode. In a general embodiment the suspension device 1 comprises one or more attachment elements 10 and one or more support elements 20 in communication with the attachment elements 10. Several exemplary embodiments of the suspension device 1 are disclosed herein.

As stated above, in a general embodiment, the device 1 comprises one or more attachment elements 10 and one or more support elements 20. The attachment elements 10 function to secure, reversibly or otherwise, the workpiece 2 to the support elements 20 so that the workpiece 2 is suspended. As discussed, there are certain advantages to suspending a polyimide or poly(amic acid) workpiece during processing so as to reduce or eliminate processing related defects. These advantages also apply to other polymer and non-polymer based workpieces.

The attachment elements 10 generally have a first end 11 and a second end 12 and may comprise, consist of or consist essentially of rigid, semi-rigid or flexible portions or a combination of the foregoing. In a particular embodiment, the attachment elements 10 are semi-rigid or flexible. In one embodiment, the attachment elements 10 provide a constant tension to the workpiece 2 (such as when a constant tension spring is used); in an alternate embodiment, the attachment elements 10 provide a tension to the workpiece that is proportional to the amount of conformational change (such as but not limited to shrinkage) experienced by the workpiece 2. As discussed, when the workpiece 2 is a polyimide or poly(amic acid) workpiece, the workpiece undergoes a conformation changes due to the imidization process, the solvent removal process, the workpiece removal process or combinations of the foregoing, which may result in processing related defects. Therefore, providing an attachment element 10 to compensate for such changes is beneficial. The attachment element 10 may be a rod, a spring, a constant tension spring, a band, a strap or similar devices. The attachment element 10 may be manufactured from any material having sufficient rigidity and/or strength to support workpiece 2 and that is capable of withstanding the temperatures required during processing (such as imidization and/or solvent removal in the case of poly(amic acid) or polyimide workpieces); the exact nature of the material is not critical to the present disclosure. The foregoing may be manufactured from a variety of materials, such as, but not limited to, metals, alloys, ceramics, rubbers, polymers, plastics or other materials known in the art, as well as a combination of the foregoing materials.

The attachment elements 10 are secured at the first end 11 to the first receiving points 3 on the workpiece 2 and at the second end 12 to the support element 20 via securing mechanisms 11A and 12A, respectively (or vice versa). The attachment elements 10 have a first end 11 and second end 12. A securing mechanism, designated 11A and 12A, may be present on first and second ends 11 and 12. The function of the securing mechanism 11A and 12A is to secure, reversibly or otherwise, the attachment element 10 to the workpiece 2 and support element 20. The workpiece 2 comprises a first receiving point 3 and support element 20 comprises a second receiving point 25 as discussed herein. The first 3 and second 25 receiving points function to provide points of attachment for the attachment element 10. The securing mechanism 11A and 12A and the first 3 and second 25 receiving points of the workpiece 2 and support element 20 may be any structures that are capable of engaging, reversibly or otherwise, one another. It is appreciated that as a result of their complementary engaging function, the form of the securing mechanism 11A and 12A may be dictated by, or may dictate, the form of the first 3 and second 25 receiving points. In a particular embodiment, the securing mechanism 11A and 12A is one half of a complementary engaging system designed to engage the second half of the complementary engaging system of the first 3 and second 25 receiving points of the workpiece 2 and support element 20, respectively. Exemplary complementary engaging systems include, but are not limited to, hook-loop fasteners, hook-eyelet combination, snap-fit devices, friction-fit devices and the like. Alternatively, the securing mechanism 11A and 12A may be a hook, a clamp, or any other structure performing a similar function that directly engages the workpiece 2 or the support element 20. A combination of securing mechanisms and first 3/second 25 receiving points may be used on one or more of the attachment element 10. For example, the securing mechanism 11A may be a hook and the first receiving point 3 may be an opening/hole, while the securing mechanisms 12A may be one-half of a snap-fit device and the second receiving point may be the second-half of the snap fit device.

Figure 1A:
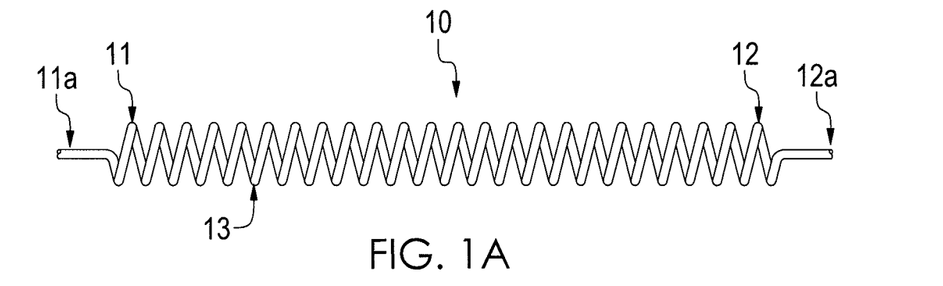
FIG. 1A shows a side view of one embodiment of an exemplary attachment element of the present disclosure.

In a specific embodiment, the attachment element 10 is a spring (designated 13) manufactured from an alloy, such as, but not limited to, stainless steel (FIG. 1A). Alternative forms of the attachment elements 10 are provided in FIG. 1B-D. FIG. 1A shows a spring 13 having a first 11 and second end 12 wherein all portions of the spring are flexible. The spring 13 is secured, reversibly or otherwise, to the support element 20 at first end 11 via securing mechanism 11A and to the workpiece at second end 12 via securing mechanism 12A. In FIG.

Figure 1B:
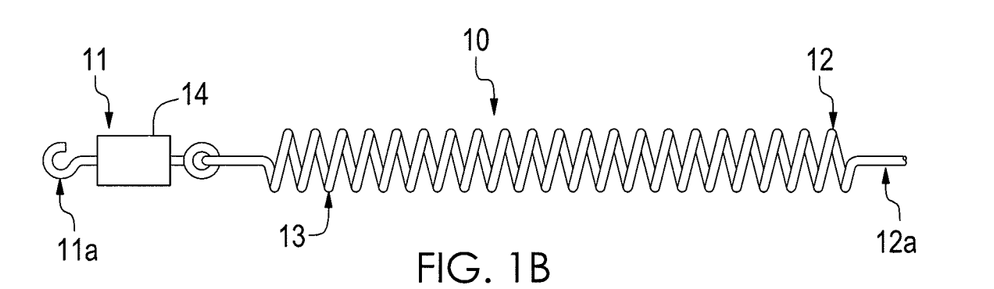
FIG. 1B shows a side view of an alternate embodiment of an exemplary attachment element of the present disclosure.
Figure 1C:
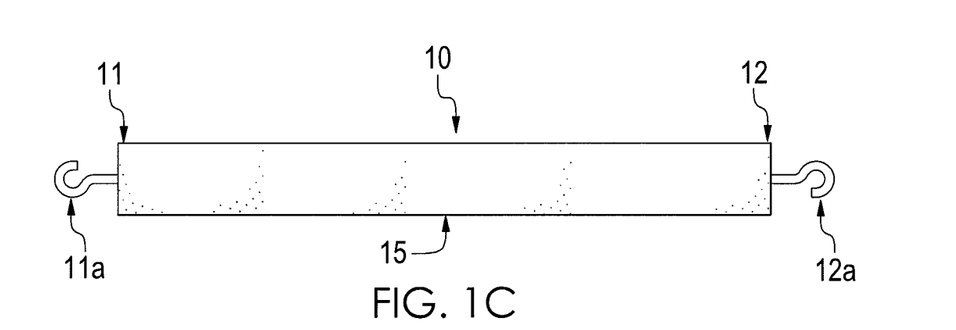
FIG. 1C shows a side view of another alternate embodiment of an exemplary attachment element of the present disclosure.
Figure 1D:
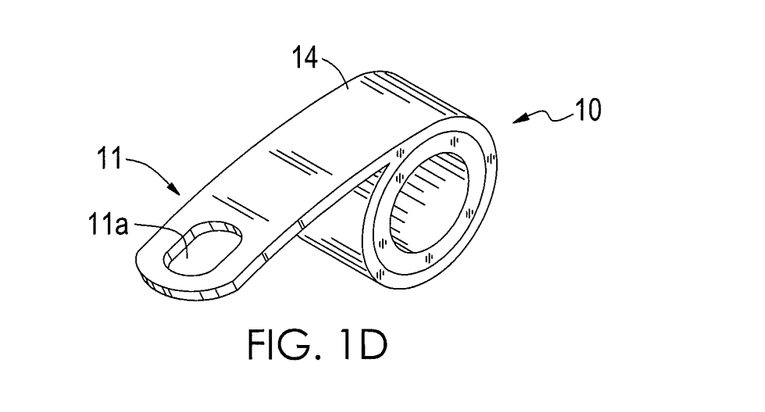
FIG. 1D shows a side view of yet another alternate embodiment of an exemplary attachment element of the present disclosure.

1A, securing mechanisms 11A and 12A are illustrated as hooks formed from the free ends of the spring 13. As noted above, other forms of attachment may also be envisioned as is known in the art. In an alternate embodiment, a spring 13 is shown with a rigid portion 14 comprising the first end 11, with a securing mechanism 11A (illustrated as a hook) for attaching to the support element 20 (FIG. 1B). FIG. 1C also shows a band, designated 15, having a first 11 and second 12 end. The band 15 is attached to the support element 20 at first end 11 and to the workpiece at second end 12 via elements 11A and 12A respectively (illustrated as hooks). FIG. 1D shows a constant tension spring 14 having a first end 11 with attachment mechanisms 11A. The second end 12 (not labeled) is located in the interior portion, with the attachment mechanism 12A being formed, in one embodiment, by the body of the constant tension spring 14 itself. Of course other embodiments could be envisioned, with the embodiments shown in FIGS. 1A-D being illustrative in nature only.

The support element 20 functions to position the attachment elements 10 such that the workpiece 2 is suspended during processing. In the case where the workpiece 2 is a polyimide or poly(amic acid) workpiece, the suspension of the workpiece allows the release of accumulated stress that is introduced by the reduction in conformational freedom as a result of the processing as well as prevents damage due to substrate retention. For poly(amic acid)/polyimide workpieces, the processing may include, but is not limited to, imidization and/or solvent removal. It should be noted that the present disclosure does not require all such stress to be released; a partial reduction in such stress is beneficial. Because the workpiece (such as, but not limited to, a poly(amic acid)/polyimide workpiece) is suspended during processing additional freedom is provided to the workpiece during processing such that the workpiece is free to dissipate such stress. Furthermore, since the workpiece is not in contact with a substrate, stresses relating to the movement of the workpiece against the substrate are eliminated. As a result, the workpiece exhibits reduced or no processing-related defects, such as, but not limited to, transformation-related defects and substrate retention-related defects in the case of a poly(amic acid)/polyimide workpiece. By allowing the accumulated stress to be dissipated during the processing, a wider variety of workpieces may be fabricated without the introduction of processing-related defects and a wider variety of starting materials may be used to produce the workpieces. In a specific application, the methods of the present disclosure allow for the production of thick workpieces, such as, but not limited to, poly(amic acid)/polyimide workpieces, that are free from or exhibit a reduction in processing-related defects.

In one embodiment, the support element 20 comprises a main body portion 21, having a first end 22 and a second end 23, an optional extension portion 24 in communication with and extending from the first end 22 of the main body portion 21 and at least one second receiving point 25 for securing, reversibly or otherwise, the attachment element 10 via securing mechanism 12A. The second receiving point 25 may be positioned on or as a part of the main body portion 21 or may be positioned on or a part of an extension portion 24. The second receiving point 25 may be modified to interact with the securing mechanism 12A of the attachment elements 10 as described above. In one embodiment, there is a support element 20 for each attachment element 10; in an alternate embodiment, there is one support element 20 for more than one attachment element 10. One support element may be designed to support more than one attachment element if desired; in such a configuration, a single main body portion 21 would provide a plurality of second receiving points 25. For example, the support element 20 may have a main body portion 21 with an extension portion 24 having one or more arms 26, with one or more of the arms 26 comprising the second receiving points 25. For example, the main body portion 21 could be in the shape of a rod with the extension portion 24 having arms 26 in a Y or U shaped configuration. In addition, the support element 20 may have a main body portion 21 in the shape of a circle or other geometric shape with the second receiving points 25 spaced at appropriate intervals around the periphery of the circle to support a plurality of attachment elements; in this configuration, one support element 20 facilitates the attachment of all the required attachment elements 10. As is obvious, the circle or other geometric shape could be divided into one or more sections if desired.

Figure 2A:
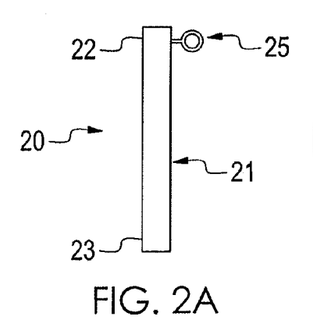
FIG. 2A shows a side view of one embodiment of an exemplary support element of the present disclosure.
Figure 2B:
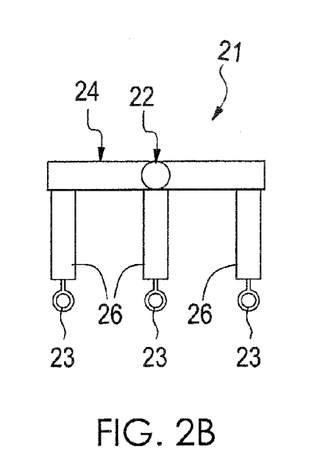
FIG. 2B shows a top view an alternate embodiment of an exemplary support element of the present disclosure.
Figure 2C:
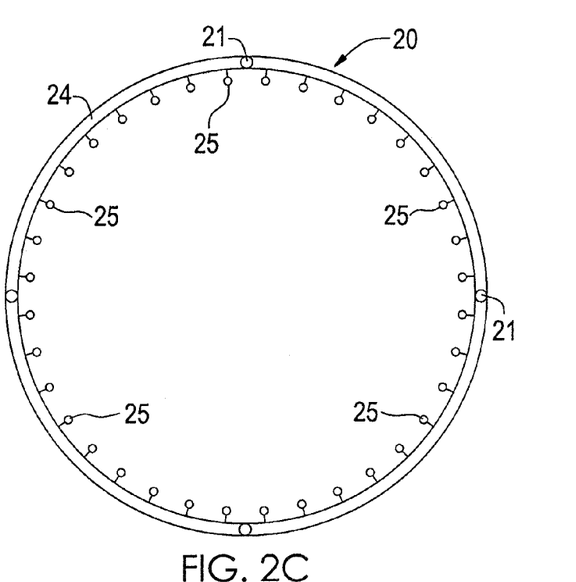
FIG. 2C shows a top view an alternate embodiment of an exemplary support element of the present disclosure.
Figure 2D:
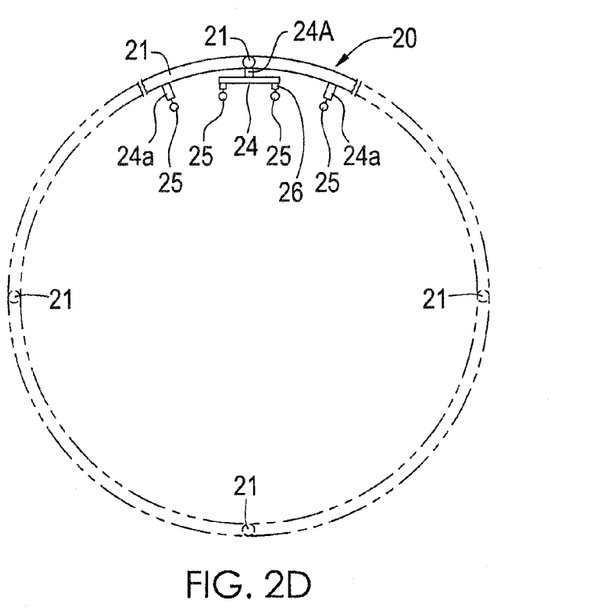
FIG. 2D shows a top view an alternate embodiment of an exemplary support element of the present disclosure.

Exemplary support elements are illustrated in FIG. 2A-2D. FIG. 2A shows a side view of a support element 20 comprising a main body portion 21 with first 22 and second 23 ends in the shape of a circular rod/column wherein the second receiving point 25 is an eyelet extending from the first end 22 of the main body portion 21. As is obvious a number of configurations for the second receiving point 25 may be envisioned. FIG. 2B shows a top view of an alternate embodiment of the support element 20 having an extension portion 24 comprising three arms 26, the extension portion 24 extending from the first end 22 of the main body portion 21 (not shown), with each arm 26 having a second receiving point 25 in the form of an eyelet. FIG. 2C shows a top view of a further alternate embodiment of the support element 20 having a main body portion 21 in the form of a rod (shown from top) and an extension portion 24 in the form of an arc with second receiving points 25 illustrated as eyelets positioned along the periphery of the arc. FIG. 2D shows a top view of a further alternate embodiment of the support element 20 having a main body portion 21 in the form of a rod/column (shown from top) and an extension portion 24 shown in the form of an arc with a plurality of second extension portions 24A extending from the main body portion 21, with each extension portion 24A supporting a second receiving point 25 in the form of an eyelet; additionally the middle second extension member 24A supports two arms 26, with each arm 26 supporting a second receiving point 25 illustrated as an eyelet. In each of the embodiments above, the second receiving point 25 serves to receive and secure, reversibly or otherwise, the first end 11 of the attachment element 10. Further, while the second receiving point is illustrated primarily as an eyelet, other receiving points may be readily envisions and are within the scope of the present disclosure as discussed above. One of ordinary skill in the art would be aware that the configuration of the securing mechanism 12A of the attachment element 10 may dictate or be dictated by, at least in part, the form of the second receiving point 25. Of course other embodiments could be envisioned, with the embodiments shown in FIGS. 2A-2D being illustrative in nature only. The exact configuration of the support elements is not critical to the present disclosure and those of ordinary skill in the art could envision multiple forms for the support elements.

Figure 4:
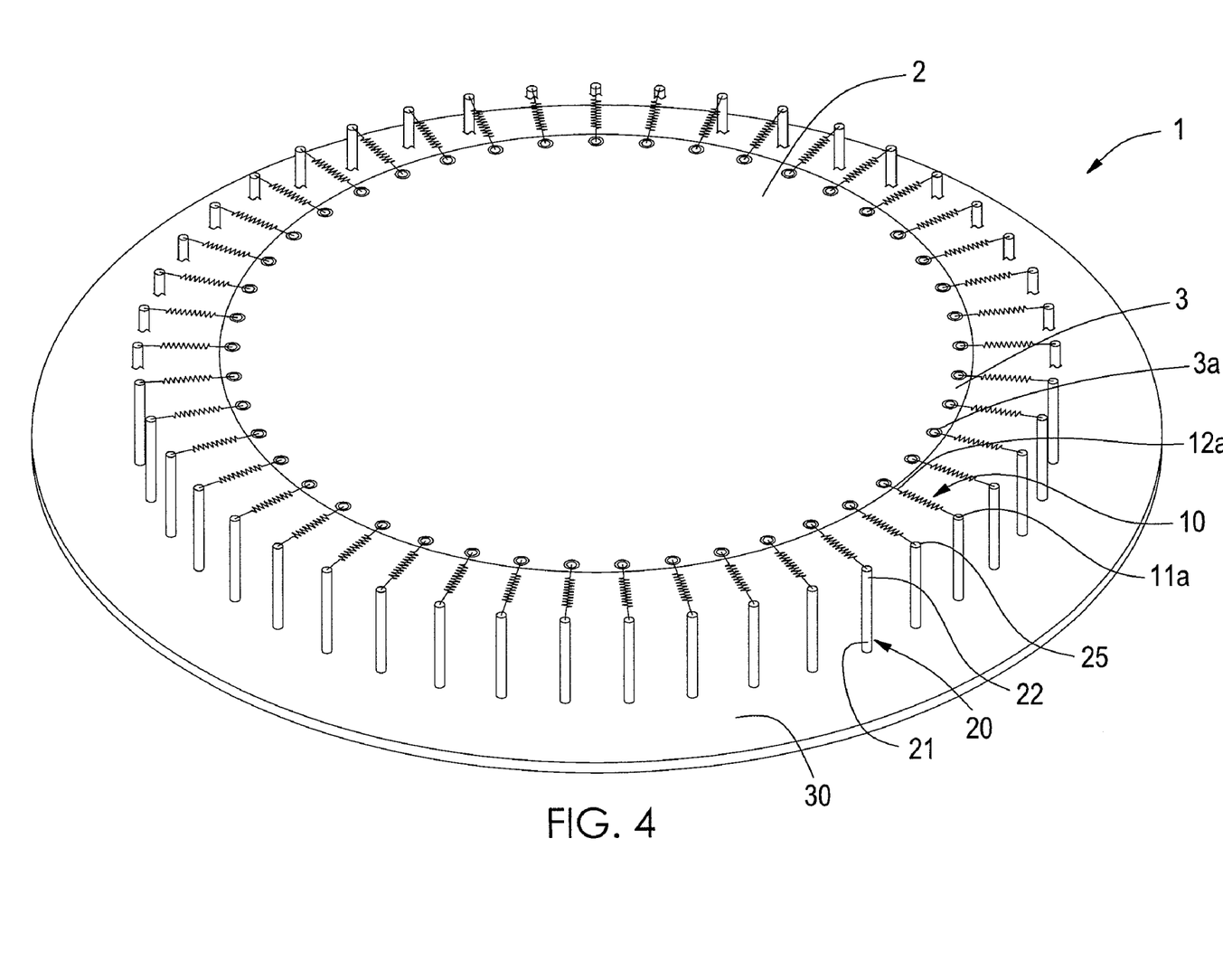
FIG. 4 shows an exemplary embodiment of the suspension device of the present disclosure.

As shown in FIG. 4, the workpiece 2 may be modified for attachment to the suspension device 1. In one embodiment, the workpiece 2 comprises a first receiving point 3 for engaging, reversibly or otherwise, the suspension device 1, such as through securing mechanism 11A on the attachment elements 10. In one embodiment, the first receiving point 3 is a hole/opening in the workpiece or simply a section of the workpiece that is engaged by the securing mechanism 11A of the attachment elements 10. The function of the first receiving point 3 is to engage, reversibly or otherwise, the securing mechanism 11A on the attachment elements 10; therefore, the form of the first receiving point 3 may be dictated by, or may dictate, at least in part the form of the securing mechanism 11A. The first receiving point 3 may be distributed along at least a portion of the periphery of the workpiece 2. The first receiving point 3 may further comprise a reinforcing structure 3A to protect the workpiece 2 from tearing or other damage during suspension. In one application of this embodiment, the reinforcing structure 3A is a grommet or similar device which engages and/or creates a hole/opening as the first receiving point 3. In an alternate application of this embodiment, the reinforcing structure 3A is a section of material placed over and/or around the first receiving point.

When the reinforcing structure 3A is a grommet of similar device, the grommet may be used to generate a hole/opening that serves as the first receiving point 3 or may be placed in an opening/hole that has been formed and serves as the first receiving point 3. The grommet aids in protecting the edges of the workpiece 2 from damage. The form of the grommet or other device is not critical to the present disclosure and any grommet or similar device may be used. Various grommets and devices for installing grommets are well known in the art. When the reinforcing structure 3A is a material, the material may be placed on the workpiece 2 to protect it from damage caused by engagement with the suspension device 1. The material may be placed around a hole/opening that serves as the first receiving point 3 or the material itself may serve as the first receiving point 3. Material suitable for such use includes, but is not limited to, commercially available polyimide film, various plastics, cloth material, other polymers, thin metals and alloys and combinations of the foregoing. Furthermore, grommets or similar devices may be used in combination with the material described.

In alternate embodiment, the workpiece 2 may be attached (in one embodiment, the attachment is reversible) to the suspension device 1 using clamps or similar devices. In such cases, the first receiving point 3 may comprise a reinforcing structure 3A such as a section of material as described above. Alternately, the first receiving point 3 may be used without the reinforcing structure 3A.

The first receiving points 3 are spaced along at least a portion of the periphery of the workpiece 2; in a particular embodiment, the first receiving points 3 are placed so that the tension and/or force applied to the workpiece 2 are uniformly distributed along the workpiece 2. In a specific embodiment where the first receiving points 3 are openings/holes, the openings/holes are spaced along at least a portion of the periphery of the workpiece 2 such that the tension and/or force applied to the workpiece 2 are uniformly distributed along the workpiece 2. For instance when the workpiece 2 is in the form of a circle and four first receiving points 3 are desired, four openings/holes may be placed at the 12, 3, 6 and 9 o-clock positions. Of course, more than four first receiving points 3 may be used in accordance with this embodiment and proper placement of the first receiving points 3 is determined by the number of first receiving points 3 desired. As is obvious, spacing of the first receiving points 3 to evenly distribute the force applied to the workpiece can also be applied to workpieces in shapes other than circular shapes. Further, while the first receiving point 3 is illustrated primarily as an hole/opening in the workpiece 2, other receiving points may be readily envisions and are within the scope of the present disclosure as discussed above.

The support element 20 may be received by a base 30 to provide support for the support elements 20. Conversely, each support element 20 may be secured, reversibly or otherwise, to a separate base portion 30A if desired. If the base 30/30A is present, the base may be a rigid base. The base may be manufactured from any material having sufficient rigidity and/or strength to support the support elements and that is capable of withstanding the temperatures required during processing (such as imidization and/or solvent removal in the case of poly(amic acid) or polyimide workpieces); the exact nature of the material is not critical to the present disclosure. In one embodiment, the base 30/30A may be manufactured from a variety of materials, such as, but not limited to, metals, alloys, ceramics, rubbers, polymers, plastics or combinations of the foregoing. When the base 30A is not provided as a part of the support element 20, the base 30 has attachment points 31 for receiving the support element 20; the number of attachment points 31 may be determined by the number of support elements 20 used. In one embodiment, the attachment points 31 include, but are not limited to, a hole, indentation, bracket, clamp or other device configured to receive the support element 20; combinations may also be used. The exact form of the attachment point 31 may be dependent on the configuration of the support element 20; for example, if the support element 20 is a square post, the attachment point 31 may be an appropriately sized square hole or indentation to receive the support element 20.

Figure 3A:
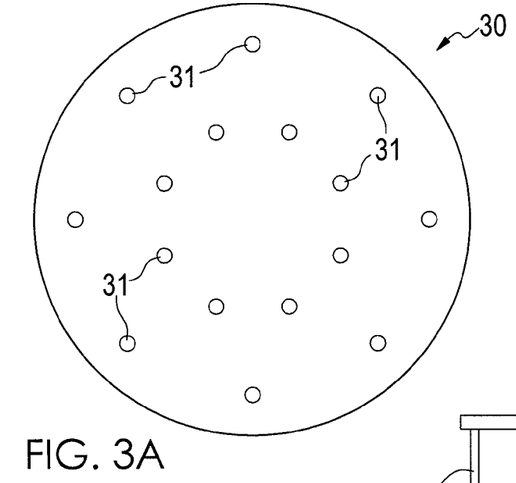
FIG. 3A shows a top view of one embodiment of the base of the present disclosure
Figure 3B:
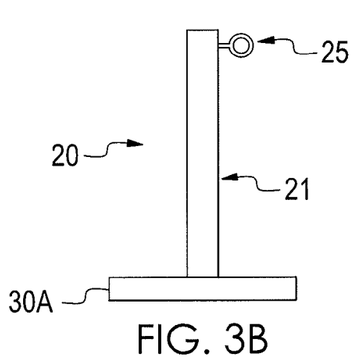
FIG. 3B shows a side view of one embodiment of a support element as illustrated in FIG. 2A in combination with a base.
Figure 3C:
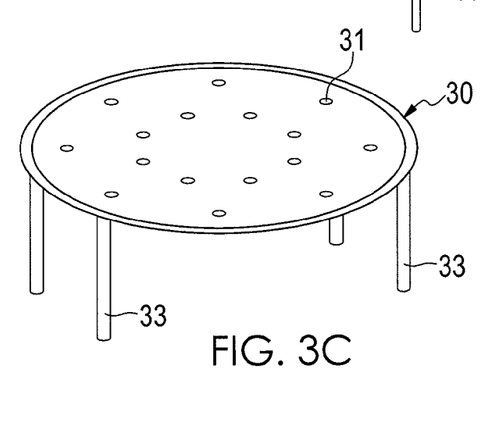
FIG. 3C shows a side view of an alternate embodiment of the base of the present disclosure.

The support element 20 is received, reversibly or otherwise, by the base 30. Of course the support elements 20 and the base 30 could be manufactured as a single unit. It would be advantageous to have the support elements 20 reversibly received by the base 30 to allow repositioning of the support elements 20 as may be required. In this configuration, the base 30 may be provided with a number of attachment points 31 sufficient to allow for use with workpieces of different sizes and/or diameters. By changing the placement of the support elements 20 (i.e., using different attachment points 31), the suspension device 1 could be used with a variety of different shaped workpieces. The support elements 20 are positioned and have a length, l, and the attachment elements 10 have a length, L, such that the workpiece 2 is suspended when initially attached to the suspension device 1 and remains suspended during processing of the workpiece. The placement of the support elements 20, the length, l, of the support elements 20 and the length, L, of the attachment elements 10 will be dependent in part on the size, diameter and/or other physical parameter of the workpiece 2 and/or the chemical composition of the workpiece 2. In cases where the workpiece 2 is a poly(amic acid) or polyimide workpiece, the polyimide or poly(amic acid) workpiece shrinks to some extent during the processing (including, but not limited to, imidization and/or solvent removal.) The position and length, l, of the support elements and the length, L, of the attachment elements may be modified based on the above considerations as would be obvious to one of skill in the art. An exemplary configuration for the base 30 is provided in FIG. 3A. In this figure, the base 30 is shown as a circular base with a number of attachment points 31 (illustrated as circular indentations) positioned in concentric circles around the center of the base 30. Of course a base of a different shape may be used and the attachment points 31 may be placed in various configurations. In an alternate embodiment shown in FIG. 3B, the base 30A is shown in attached to an individual support element 20, with the support element 20 being as illustrated in FIG. 1A. The base 30 may be supported on a structure, or the base 30 may further comprise legs 33 or other support structure (FIG. 3C).

Figure 3D:
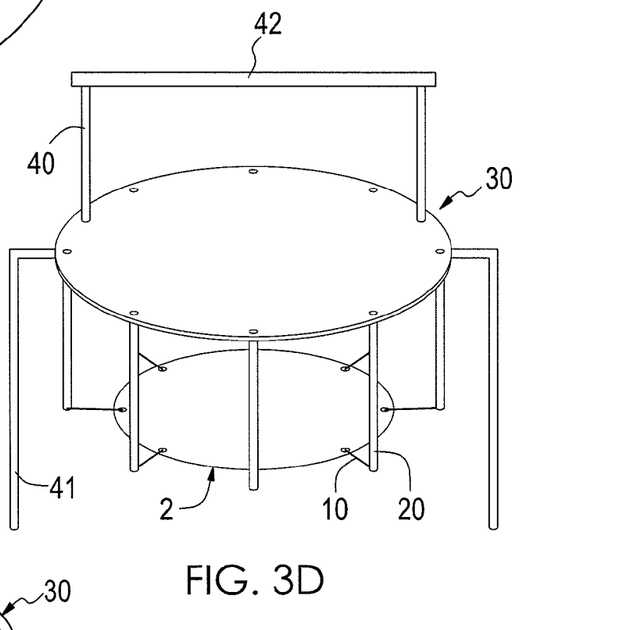
FIG. 3D shows a side view of an alternate embodiment of the base of the present disclosure.

Alternatively, the base 30 may be suspended above the ground if desired, with the support elements 20 extending downward from the base 30. The base 30 may be suspended from a ceiling or other supported structure 42 by elements 40, or may have its own support structure 41 as would be obvious to one of ordinary skill in the art (FIG. 3D)

However, a specific embodiment of such device is provided herein. FIG. 4 illustrates such a suspension device 1. In this embodiment, the base 30 is illustrated as a circular base constructed from an alloy or metal. The base 30 supports a plurality of attachment elements 20. The attachment elements 20 have a circular main body portion 21. The second end 23 of each main body portion 21 is reversibly received by attachment points 31, which are in this embodiment appropriately sized circular holes in the base 30. The first end 22 of the main body portion 21 is reversibly secured to the first end 11 of the attachment element 10 at second receiving point 25. In this example the attachment element is a spring 13. The second end 12 of the spring 13 is reversibly secured to the workpiece 2, in this case a polyimide or poly(amic acid) workpiece, at first receiving point 3. In this example, the spring 13 and the support element 20 are manufactured from a metal or alloy. The polyimide or poly(amic acid) workpiece 2 is modified at the first receiving point 3 with a reinforcing structure 3A, illustrated as grommets extending through the workpiece 2 and a material surrounding the first receiving point and the grommet. As shown in FIG. 4, the support elements 20 have an arrangement and a length, l, and the attachment elements 10 (shown as springs 13) have a length, L, such that the workpiece 2 is suspended above the base 30. The only contact of the workpiece 2 occurs at the first receiving point 3 where the attachment elements 10 are reversibly secured to the workpiece 2 as described. The springs 13 provide a constant force on the workpiece 2 during processing (including, but not limited to, imidization and solvent removal). As a result of the workpiece 2 being suspended during processing, the occurrence of processing-related defects, such as transformation-related defects and substrate retention-related defects, are reduced or eliminated.

Other embodiment of the suspension device 1 are possible, with the foregoing being provided for exemplary purposes only. Modifications to the foregoing which are within the skill on of ordinary skill in the art are considered covered by the present disclosure.

In an alternate embodiment, the suspension device is used in a continuous mode. The poly(amic acid) or polyimide solution is deposited on a moving platform. A variety of methods may be used to deposit the poly(amic acid) or polyimide solution on the conveyor belt. For example, a slot die/extrusion coating may be used; alternatively, other methods such as curtain coating, immersion coating, pressure coating, reverse-roll coating, knife over role coating, air knife coating or metering rod coating may also be used. The desired thickness of the poly(amic acid) or polyimide composition can be adjusted by a variety of mechanisms known in the art. The moving platform may take on a number of configurations as well. In one embodiment, the moving platform is a conveyor constructed from a material that is non-reactive to the poly(amic acid) or polyimide solution; exemplary materials include, but are not limited to, metals, alloys, ceramics, rubbers, polymers, plastics or other materials known in the art, as well as a combination of the foregoing materials. In one embodiment, the poly(amic acid) or polyimide workpiece and the finished poly(amic acid) or polyimide composition is in the form of a extended sheet.

After being deposited on the moving platform, the poly (amic acid) or polyimide solution is subject to initial curing to produce an uncured poly(amic acid) or polyimide workpiece. In one embodiment, the moving platform on which the poly (amic acid) or polyimide solution is placed passes through a low temperature oven. In one embodiment, the curing oven is maintained at a temperature of 100 degrees Celsius (C) or less or 150 degrees C. or less. The speed of the moving platform (i.e., the residence time in the low-temperature oven), path length through the low-temperature oven and the temperature of the oven can be adjusted to achieve the transition of the poly(amic acid) or polyimide solution to the uncured poly (amic acid) or polyimide workpiece. In one embodiment, the poly(amic acid) or polyimide solution is subject to a residence time of 5-45 minutes in the low-temperature oven.

Once the uncured poly(amic acid) or polyimide workpiece is formed, the workpiece is attached to a suspension device as described herein. In one embodiment the attachment elements are as described above and the support elements are parallel bars mirroring the path of the moving platform. As above, the attachment elements are in reversible communication with the workpiece on one end and the supporting elements on the other. The workpiece may be modified by the addition of reinforcing structures in an automatic or manual manner as the workpiece is being transported by the moving platform. Once the poly(amic acid) or polyimide workpiece is attached to the suspension device, the workpiece is removed from the moving platform and transited through the remaining processing steps in a suspended manner. Once suspended, the workpiece is subject to curing by passage through heating ovens with successively higher curing temperatures. In one embodiment, the curing oven is maintained at a temperature of 250 degrees C. or less or 300 degrees C. or less. The speed of the moving platform (i.e., the residence time in the high-temperature oven), path length through the high-temperature oven and the temperature of the oven can be adjusted to achieve the transition of the poly(amic acid) or polyimide workpiece to the cured polyimide workpiece. In one embodiment, the poly(amic acid) or polyimide workpiece is subject to a residence time of 5-45 minutes in the high-temperature oven.

Upon exiting the last heating oven, the finished workpiece is removed from the suspension device and can be wound on a roll or further processed in subsequent steps.

Other embodiment of the suspension device 1 are possible, with the foregoing being provided for exemplary purposes only. Modifications to the foregoing which are within the skill on of ordinary skill in the art are considered covered by the present disclosure.

Methods of Manufacture and Polyimide Compositions

The suspension device of the present disclosure may be used in conjunction with a variety of methods of manufacture. In one embodiment, the suspension device of the present disclosure is used in conjunction with a poly(amic acid) and/or polyimide workpiece, although workpieces comprising other chemicals and polymers may also be used. In the event the workpiece is a poly(amic acid)/polyimide workpiece, it may be generated from any combination reagents that are known in the field. In a specific embodiment, the polyimide composition/workpiece is a combination of at least one diamine and at least one dianhydride component. The at least one diamine and dianhydride components may be any diamine or dianhydride components that are known in the art.

Exemplary diamine components include, but are not limited to, 4,4'-oxydianiline (4,4'-ODA), 3,4'-oxydianiline (3,4'-ODA), 3,3'-oxydianiline (3,3'-ODA), p-phenylenediamine (p-PDA), m-phenylenediamine (m-PDA), o-phenylenediamine (o-PDA), diaminobenzanilide (DABA), 3,5-diaminobenzoic acid, 3,3'-diaminodiphenylsulfone (3,3'-DDSO$_2$), 4,4'-diaminodiphenyl sulfones, 1,3-bis-(4-aminophenoxy) benzene (APB-134), 1,3-bis-(3-aminophenoxy)benzene (APB-133), 1,4-bis-(4-aminophenoxy)benzene, 1,4-bis-(3-aminophenoxy)benzene, 2,2-Bis[4-(4-aminophenoxy)phenyl]-hexafluoropropane 2,2-bis(3-aminophenyl) 1,1,1,3,3,3-hexafluoropropane, 4,4'-isopropylidenedianiline, 1-(4-aminophenoxy)-3-(3-aminophenoxy)benzene, 1-(4-aminophenoxy)-4-(3-aminophenoxy)benzene, bis-[4-(4-aminophenoxy)phenyl]sulfones (BAPS), 2,2-bis[4-(3-aminophenoxy)phenyl]sulfones (m-BAPS), bis(4-[4-aminophenoxy]phenyl)ether (BAPE), 2,2'-bis-(4-aminophenyl)-hexafluoropropane (BDAF), (6F-diamine), 2,2'-bis-(4-phenoxyaniline)isopropylidene, meta-phenylenediamine, para-phenylenediamine, 1,2-diaminobenzene, 4,4'-diaminodiphenylmethane, 2,2-bis(4-aminophenyl)propane, 4,4'diaminodiphenyl propane, 4,4'-diaminodiphenyl sulfide, 4,4'-diaminodiphenylsulfone (DDS), 3,4'diaminodiphenyl ether, 4,4'-diaminodiphenyl ether, 2,6-diaminopyridine, bis(3-aminophenyl)diethyl silane, 4,4'-diaminodiphenyl diethyl silane, benzidine, 3,3'-dichlorobenzidine, 3,3'-dimethoxybenzidine, 4,4'-diaminobenzophenone, N,N-bis(4-aminophenyl)-n-butylamine, N,N-bis(4-aminophenyl)methylamine, 1,5-diaminonaphthalene, 3,3'-dimethyl-4,4'-diaminobiphenyl, 4-aminophenyl-3-aminobenzoate, N,N-bis(4-aminophenyl)aniline, bis(p-beta-amino-t-butylphenyl) ether, p-bis-2-(2-methyl-4-aminopentyl)benzene, p-bis(1,1-dimethyl-5-aminopentyl)benzene, 1,3-bis(4-aminophenoxy) benzene, m-xylylenediamine, p-xylylenediamine, 4,4'-diaminodiphenyl ether phosphine oxide, 4,4'-diaminodiphenyl N-methyl amine, 4,4'-diaminodiphenyl N-phenyl amine, amino-terminal polydimethylsiloxanes, amino-terminal polypropyleneoxides, amino-terninal polybutyleneoxides, 4,4'-Methylenebis(2-methylcyclohexylamine), adipic acid, 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 4,4'-methylenebisbenzeneamine (MDA), or combinations thereof.

Exemplary dianhydride components include, but are not limited to, hydroquinone dianhydride (HQDA), 3,3',4,4'-biphenyl tetracarboxylic dianhydride (sBPDA), pyromellitic dianhydride (PMDA), 3,3',4,4'-benzophenone tetracarboxylic dianhydride (BTDA), 4,4'-oxydiphthalic anhydride (ODPA), 3,3',4,4'-diphenylsulfone tetracarboxylic dianhydride (DSDA), 4,4'-(4,4'-isopropylidenediphenoxy)bis(phthalic anhydride) (BPADA), 2,2-bis(3,4-dicarboxyphenyl) propane dianhydride, 4,4'-(hexafluoroisopropylidene) diphthalic anhydride (6FDA), bis(3,4-dicarboxyphenyl) sulfoxide dianhydride, polysiloxane-containing dianhydride, 2,2',3,3'-biphenyltetracarboxylic dianhydride, 2,3,2',3'-benzophenonetetracarboxylic dianhydride, 3,3',4,4'-benzophenonetetracarboxylic dianhydride, naphthalene-2,3,6,7-tetracarboxylic dianhydride, naphthalene-1,4,5,8-tetracarboxylic dianhydride, 4,4'-oxydiphthalic dianhydride, 3,3',4,4'-biphenylsulfone tetracarboxylic dianhydride, 3,4,9,10-perylene tetracarboxylic dianhydride, bis(3,4-dicarboxyphenyl)sulfide dianhydride, bis(3,4-dicarboxyphenyl)methane dianhydride, 2,2-bis(3,4-dicarboxyphenyl)propane dianhydride, 2,2-bis(3,4-dicarboxyphenyl)hexafluoropropane, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-1,4,5,8-tetracarboxylic dianhydride, phenanthrene-8,9,10-tetracarboxylic dianhydride, pyrazine-2,3,5,6-tetracarboxylic dianhydride, benzene-1,2,3,4-tetracarboxylic dianhydride, thiophene-2,3,4,5-tetracarboxylic dianhydride, or combinations of the foregoing.

In one embodiment, the diamine and dianhydride compositions are those described in PCT application No. PCT/US2006/29805, which is incorporated by reference herein in its entirety. Additional dianhydride and diamine components are listed in "Polyimides Fundamentals and Applications", Marcel Dekker, Inc. (1996), which is hereby incorporated by reference in its entirety.

The polyimide compositions may be prepared as is generally known in the art (for example, see U.S. Pat. Nos. 3,179,630 and 3,179,634, "Polyimides-Thermally Stable Polymers", Plenum Publishing (1987), and "Synthesis and Characterization of Thermosetting polyimide Oligomers for Microelectronics Packaging, Dunson D.L., (Dissertation submitted to faculty of the Virginia Polytechnic Institute and State University, Apr. 21, 2000). Each of the foregoing references is incorporated by reference herein in their entirety.

Results

The following results were obtained using the suspension device of the present disclosure. The results are shown for illustrative purposes to demonstrate the teachings of the present disclosure and should not be interpreted to limiting the scope of the present disclosure to the provided examples. In each of the examples, provided, the suspension device was in substantially the same for as described in FIG. 4. The terms film as used in the examples is equivalent to the term workpiece as used above.

EXAMPLE 1

Preparation of a Thick Polyimide Film from a Homopolymer of pPDA/sBPDA Using the Methods and Devices of the Present Disclosure This example describes the preparation of a 2 mil thick polyimide film from a homopolymer of pPDA/sBPDA using the methods and devices of the present disclosure. Due to the nature of the poly(amic acid) formed by this combination of pPDA/sBDPA, the composition undergoes a substantial amount of shrinkage and conformational change during imidization and solvent removal which can lead to processing-related defects in the finished film, such as, but not limited to, transformation-related defects. Such processing-related defects increase in frequency as the thickness of a desired polyimide film increases. The preparation of the polyimide film of this example is provided below.

To a 500 mL three-neck round bottom flask equipped with an overhead stirrer, thermometer, and rubber septa was added 27.70 g s-BPDA. The flask was sealed and purged with dry nitrogen for 1 hour with gentle agitation from the overhead stir shaft. To a separate 250 mL single-neck round bottom flask were added 10.08 g p-PDA and a magnetic stirbar. The flask was sealed and purged with dry nitrogen for 1 hour as above. 200 g anhydrous N,N-Dimethylacetamide (DMAc) solvent was introduced with a double-tipped needle into the amine-containing flask with a dry nitrogen sparge and vigorous agitation. The amine solution was transferred to the dianhydrides-containing flask with a double tip needle while applying slow stirring from the overhead stir shaft under a dry nitrogen blanket. The solution was allowed to react for an additional 16 hours as the dianhydrides dissolved. The resultant solution is approximately 80,000 centipose (cp) in viscosity at 25 degrees C. The poly(amic acid) solution was flow cast onto a 12" glass substrate, and allowed to air dry overnight in a humidity-controlled chamber to yield a film of uncured poly(amic acid). The uncured poly(amic acid) film was removed from the glass, and grommets were attached to the poly(amic acid) near the edge. The film was attached to a device of the present disclosure so that the uncured poly(amic acid) film was suspended and not in contact with a substrate. The assembly was cured in a forced air oven using a stage curing profile of 100° C. (1 hour); ramp to 200 degrees C. (1 hour); hold at 200 degrees C. (1 hour); ramp to 300 degrees C. (1 hour); hold at 300 degrees C. (1 hour). The resultant film was flat, free from processing-related defects, approximately 2 mils thick, of uniform thickness across the surface area, and fingernail creasable. The film exhibited 1230 ksi modulus, 46 ksi tensile strength, and 19% elongation at break. These properties were substantially the same when measured at 0 degrees, 45 degrees, and 90 degrees radial configurations.

The methods and devices of the present disclosure successfully allowed the production of a 2 mil thick polyimide film from a homopolymer of pPDA/sBPDA.

EXAMPLE 2

Unsuccessful Preparation of a Thick Polyimide Film from a Homopolymer of pPDA/sBPDA Using the Methods and Devices of the Prior Art This example describes the preparation of a thick polyimide film from a homopolymer of pPDA/sBPDA using the methods and devices of the prior art. The poly(amic acid) solution was prepared exactly as described in Example 1 and flow cast onto a 12" glass substrate. The poly(amic acid) solution was allowed to air dry overnight in a humidity-controlled chamber to yield a film of uncured poly(amic acid). The uncured poly(amic acid) film was secured to the glass using Kapton tape at the edges of the uncured poly(amic acid) film. The poly(amic acid) coated glass was cured in a forced air oven using a stage curing profile as described in Example 1. As a result of the uncured film being secured to the edges of the glass substrate, the film tore at the tape edges due to the inability of the film to release accumulated stress imparted to the film as the result of the conformational changes introduced as a result of processing (such as, but not limited to, imidization and solvent removal) and formed a buckled and curled film during curing. In addition, the film thickness varied from 1 mil to 4 mils in thickness across the surface area, and the glass was spalled on approximately 20% of the surface area. Such processing-related defects rendered the final polyimide film unsuitable for use.

As is evident, the preparation of a thick polyimide film from a homopolymer of pPDA/sBPDA using the methods and devices of the prior art produces a polyimide film that is not suitable for use. However, as described in Example 1, the preparation of a thick polyimide film from a homopolymer of pPDA/sBPDA using the methods and devices of the present disclosure was easily accomplished and produced a polyimide film suitable for use in a wide variety of applications.

EXAMPLE 3

Unsuccessful Preparation of a Thick Polyimide Film from a Homopolymer of pPDA/sBPDA Using the Methods and Devices of the Prior Art This example describes the preparation of a thick polyimide film from a homopolymer of pPDA/sBPDA using the methods and devices of the prior art. The poly(amic acid) solution from Example 1 was flow cast onto a 12" glass substrate, and allowed to air dry overnight in a humidity-controlled chamber to yield a film of uncured poly(amic acid). The uncured poly(amic acid) film was secured to the glass using Kapton tape at the edges, and further secured with additional application of ¾" Kapton tape applied towards the inside of the film to provide additional grip of the uncured poly(amic acid) film during cure. The poly(amic acid) coated glass was cured in a forced air oven using a stage curing profile as described in Example 1. The polymer film shattered during cure into pieces approximately 5 mm×5 mm.

As is evident, the preparation of a thick polyimide film from a homopolymer of pPDA/sBPDA using the methods and devices of the prior art produces a polyimide film that is not suitable for use. However, as described in Example 1, the preparation of a thick polyimide film from a homopolymer of pPDA/sBPDA using the methods and devices of the present disclosure was easily accomplished and produced a polyimide film suitable for use in a wide variety of applications.

EXAMPLE 4

Unsuccessful Preparation of a Thick Polyimide Film from a Homopolymer of pPDA/sBPDA Using the Methods and Devices of the Prior Art This example describes the preparation of a thick polyimide film from a homopolymer of pPDA/sBPDA using the methods and devices of the prior art. The poly(amic acid) solution from Example 1 was flow cast onto a 12" glass substrate, and allowed to air dry overnight in a humidity-controlled chamber to yield a film of uncured poly(amic acid). The uncured poly(amic acid) film was secured to the glass using Kapton tape at the edges, and further secured with additional application of ¾" Kapton tape applied towards the inside of the film to provide additional grip of the polymer film during cure. A separate 12" diameter glass substrate was placed on top of the poly(amic acid) film, and a 12" metal plate was placed on top of the second glass. Three metal weights of 3 kg each were applied to the top of the metal plate, and the entire assembly was cured in a forced air oven using a stage curing profile as described in Example 1. The polymer film shattered during cure into pieces approximately 5 mm×5 mm.

As is evident, the preparation of a thick polyimide film from a homopolymer of pPDA/sBPDA using the methods and devices of the prior art produces a polyimide film that is not suitable for use. However, as described in Example 1, the preparation of a thick polyimide film from a homopolymer of pPDA/sBPDA using the methods and devices of the present disclosure was easily accomplished and produced a polyimide film suitable for use in a wide variety of applications.

EXAMPLE 5

Successful Preparation of a Thick Polyimide Film from a Copolymer of pPDA/sBPDA-6FDA Using the Methods and Devices of the Present Disclosure This example describes the preparation of a 2 mil thick polyimide film from a copolymer of pPDA/sBPDA-6FDA using the methods and devices of the present disclosure. Due to the nature of the poly(amic acid) formed by this combination of pPDA/sBDPA-6FDA, the composition undergoes a substantial amount of shrinkage and conformational change during processing (including, but not limited to, imidization and solvent removal) which can lead to processing-related defects in the finished film, such as, but not limited to, transformation-related defects. Such processing-related defects increase in frequency as the thickness of a desired polyimide film increases. The preparation of the polyimide film of this example is provided below.

To a 500 mL three-neck round bottom flask equipped with an overhead stirrer, thermometer, and rubber septa were added 14.46 g s-BPDA and 14.56 g 6FDA. The flask was sealed and purged with dry nitrogen for 1 hour with gentle agitation from the overhead stir shaft. To a separate 250 mL single-neck round bottom flask were added 8.77 g p-PDA and a magnetic stirbar. The flask was sealed and purged with dry nitrogen for 1 hour. 200 g anhydrous DMAc solvent was introduced with a double-tipped needle into the amine-containing flask with a dry nitrogen sparge and vigorous agitation. The amine solution was transferred to the dianhydrides-containing flask with a double tip needle while applying slow stirring from the overhead stir shaft under a dry nitrogen blanket. The solution was allowed to react for an additional 16 hours as the dianhydrides dissolved. The resultant solution is approximately 50,000 cp in viscosity at 25 degrees C. The poly(amic acid) solution was flow cast onto a 12" glass substrate, and allowed to air dry overnight in a humidity-controlled chamber to yield a film of uncured poly(amic acid). The uncured poly(amic acid) film was removed from the glass, and grommets were attached to the poly(amic acid) near the edge. The film was attached to a device of the present disclosure so that the uncured poly(amic acid) film was suspended and not in contact with a substrate. The assembly was cured in a forced air oven using a stage curing profile of 100 degrees C. (1 hour); ramp to 200 degrees C. (1 hour); hold at 200 degrees C. (1 hour); ramp to 300 degrees C. (1 hour); hold at 300 degrees C. (1 hour). The resultant film was flat, free from processing-related defects and damage associated with substrate adherence, approximately 2 mils thick, uniform thickness across the surface area, and fingernail creasable. The film exhibited 640 ksi modulus, 24 ksi tensile strength, and 13% elongation at break. The film exhibited a CTE of 13.2 ppm/K. These properties were substantially the same when measured at 0 degrees, 45 degrees, and 90 degrees radial configurations.

The methods and devices of the present disclosure successfully allowed the production of a 2 mil thick polyimide film from a homopolymer of pPDA/sBPDA-6FDA.

EXAMPLE 6

Successful Preparation of a Thick Polyimide Film from a Copolymer of pPDA-BDAF/sBPDA Using the Methods and Devices of the Present Disclosure This example describes the preparation of a 2 mil thick polyimide film from a copolymer of pPDA-BDAF/sBPDA using the methods and devices of the present disclosure. Due to the nature of the poly(amic acid) formed by this combination of pPDA-BDAF/sBPDA, the composition undergoes a substantial amount of shrinkage and conformational change during processing (including, but not limited to, imidization and solvent removal) which can lead to processing-related defects in the finished film, such as, but not limited to, transformation-related defects. Such processing-related defects increase in frequency as the thickness of a desired polyimide film increases. The preparation of the polyimide film of this example is provided below.

To a 500 mL three-neck round bottom flask equipped with an overhead stirrer, thermometer, and rubber septa was added 23.00 g s-BPDA. The flask was sealed and purged with dry nitrogen for 1 hour with gentle agitation from the overhead stir shaft. To a separate 250 mL single-neck round bottom flask were added 6.70 g p-PDA, 8.03 g BDAF, and a magnetic stirbar. The flask was sealed and purged with dry nitrogen for 1 hour. 200 g anhydrous DMAc solvent was introduced with a double-tipped needle into the amine-containing flask with a dry nitrogen sparge and vigorous agitation. The amine solution was transferred to the dianhydrides-containing flask with a double tip needle while applying slow stirring from the overhead stir shaft under a dry nitrogen blanket. The solution was allowed to react for an additional 16 hours as the dianhydrides dissolved. The resultant solution is approximately 50,000 cp in viscosity at 25 degrees C. The poly(amic acid) solution was flow cast onto a 12" glass substrate, and allowed to air dry overnight in a humidity-controlled chamber to yield a film of uncured poly(amic acid). The uncured poly(amic acid) film was removed from the glass, and grommets were attached to the poly(amic acid) near the edge. The uncured poly(amic acid) film was removed from the glass, and grommets were attached to the poly(amic acid) near the edge. The film was attached to a device of the present disclosure so that the uncured poly(amic acid) film was suspended and not in contact with a substrate. The assembly was cured in a forced air oven using a stage curing profile of 100 degrees C. (1 hour); ramp to 200 degrees C. (1 hour); hold at 200 degrees C. (1 hour); ramp to 300 degrees C. (1 hour); hold at 300 degrees C. (1 hour). The resultant film was flat, free from processing-related defects and damage associated with substrate adherence, approximately 2 mils thick, uniform thickness across the surface area, and fingernail creasable. The film exhibited 586 ksi modulus, 24 ksi tensile strength, and 40% elongation at break. The film exhibited a CTE of 22.9 ppm/K. These properties were substantially the same when measured at 0 degrees, 45 degrees, and 90 degrees radial configurations.

The methods and devices of the present disclosure successfully allowed the production of a 2 mil thick polyimide film from a homopolymer of pPDA-BDAF/sBPDA.

EXAMPLE 7

Successful Preparation of a Thick Polyimide Film from a Copolymer of pPDA-BDAF/sBPDA-6FDA Using the Methods and Devices of the Present Disclosure This example describes the preparation of a 2 mil thick polyimide film from a copolymer of pPDA-BDAF/sBPDA-6FDA using the methods and devices of the present disclosure. Due to the nature of the poly(amic acid) formed by this combination of pPDA-BDAF/sBPDA-6FDA, the composition undergoes a substantial amount of shrinkage and conformational change during processing (including, but not limited to, imidization and solvent removal) which can lead to processing-related defects in the finished film, such as, but not limited to, transformation-related defects. Such processing-related defects increase in frequency as the thickness of a desired polyimide film increases. The preparation of the polyimide film of this example is provided below.

To a 500 mL three-neck round bottom flask equipped with an overhead stirrer, thermometer, and rubber septa were added 17.33 g s-BPDA and 6.54 g 6FDA. The flask was sealed and purged with dry nitrogen for 1 hour with gentle agitation from the overhead stir shaft. To a separate 250 mL single-neck round bottom flask were added 6.31 g p-PDA, 7.56 g BDAF, and a magnetic stirbar. The flask was sealed and purged with dry nitrogen for 1 hour. 200 g anhydrous DMAc solvent was introduced with a double-tipped needle into the amine-containing flask with a dry nitrogen sparge and vigorous agitation. The amine solution was transferred to the dianhydrides-containing flask with a double tip needle while applying slow stirring from the overhead stir shaft under a dry nitrogen blanket. The solution was allowed to react for an additional 16 hours as the dianhydrides dissolved. The resultant solution is approximately 50,000 cp in viscosity at 25 degrees C. The poly(amic acid) solution was flow cast onto a 12" glass substrate, and allowed to air dry overnight in a humidity-controlled chamber to yield a film of uncured poly (amic acid). The uncured poly(amic acid) film was removed from the glass, and grommets were attached to the poly(amic acid) near the edge. The film was attached to a device of the present disclosure so that the uncured poly(amic acid) film was suspended and not in contact with a substrate. The assembly was cured in a forced air oven using a stage curing profile of 100 degrees C. (1 hour); ramp to 200 degrees C. (1 hour); hold at 200 degrees C. (1 hour); ramp to 300 degrees C. (1 hour); hold at 300 degrees C. (1 hour). The resultant film was flat, free from processing-related defects and damage associated with substrate adherence, approximately 2 mils thick, uniform thickness across the surface area, and fingernail creasable. The film exhibited 752 ksi modulus, 28 ksi tensile strength, and 24% elongation at break. The film exhibited a CTE of 13.60 ppm/K. These properties were substantially the same when measured at 0 degrees, 45 degrees, and 90 degrees radial configurations.

The methods and devices of the present disclosure successfully allowed the production of a 2 mil thick polyimide film from a homopolymer of pPDA-BDAF/sBPDA-6FDA.

EXAMPLE 8

Unsuccessful Preparation of a Thick Polyimide Film from a Copolymer of pPDA-BDAF/sBPDA-6FDA Using the Methods and Devices of the Prior Art This example describes the preparation of a thick polyimide film from a copolymer of pPDA-BDAF/sBPDA-6FDA using the methods and devices of the prior art. The poly(amic acid) solution was prepared exactly as described in Example 7 and flow cast onto a 12" glass substrate, and allowed to air dry overnight in a humidity-controlled chamber to yield a film of uncured poly(amic acid). The uncured poly(amic acid) film was secured to the glass using Kapton tape at the edges of the uncured poly(amic acid) film. The assembly was cured in a forced air oven using a stage curing profile as described in Example 7. As a result of the uncured film being secured to the edges of the glass substrate, the film tore at the tape edges due to the inability of the film to release accumulated stress imparted to the film as the result of the conformational changes introduced as a result of processing (including, but not limited to, imidization and solvent removal) and formed a buckled and curled film during curing. In addition, the film thickness varied from 1 mil to 4 mils in thickness across the surface area, and the glass was spalled on approximately 20% of the surface area. Such processing-related defects rendered the final polyimide film unsuitable for use.

As is evident, the preparation of a thick polyimide film from a copolymer of pPDA-BDAF/sBPDA-6FDA using the methods and devices of the prior art produces a polyimide film that is not suitable for use. However, as described in Example 7, the preparation of a thick polyimide film from a copolymer of pPDA-BDAF/sBPDA-6FDA using the methods and devices of the present disclosure was easily accomplished and produced a polyimide film suitable for use in a wide variety of applications.

EXAMPLE 9

Unsuccessful Preparation of a Thick Polyimide Film from a Copolymer of pPDA-BDAF/sBPDA-6FDA Using the Methods and Devices of the Prior Art This example describes the preparation of a polyimide film from a copolymer of pPDA-BDAF/sBPDA-6FDA using the methods and devices of the prior art. The poly(amic acid) solution was prepared exactly as described in Example 7, but in addition was thinned to 850 cp using anhydrous DMAc. The uncured poly(amic acid) solution was flow cast onto a 12" glass substrate, and allowed to air dry overnight in a humidity-controlled chamber to yield a film of uncured poly(amic acid). The uncured poly(amic acid) film was secured to the glass using Kapton tape at the edges of the uncured poly(amic acid) film. The assembly was cured in a forced air oven using a stage curing profile as described in Example 7. The resultant polyimide film was removed from the glass by immersion in deionized water. The film curled into a tube after release, indicating mechanical anisotropy through the thickness of the film. The film was approximately 0.4 mil thick. Such processing-related defects rendered the final polyimide film unsuitable for use.

As is evident, the preparation of a polyimide film from a copolymer of pPDA-BDAF/sBPDA-6FDA using the methods and devices of the prior art produces a polyimide film that is not suitable for use. However, as described in Example 7, the preparation of a thick polyimide film from a copolymer of pPDA-BDAF/sBPDA-6FDA using the methods and devices of the present disclosure was easily accomplished and produced a polyimide film suitable for use in a wide variety of applications.

EXAMPLE 10

Successful Preparation of a Thick Polyimide Film from a Homopolymer of ODA/PMDA Using the Methods and Devices of the Present Disclosure This example describes the preparation of a 2 mil thick polyimide film from a homopolymer of ODA/PMDA using the methods and devices of the present disclosure. Due to the nature of the poly(amic acid) formed by this combination of ODA/PMDA, the composition undergoes a substantial amount of shrinkage and conformational change during processing (including, but not limited to, imidization and solvent removal) which can lead to processing-related defects in the finished film, such as, but not limited to, transformation-related defects. Such processing-related defects increase in frequency as the thickness of a desired polyimide film increases. The preparation of the polyimide film of this example is provided below.

To a 500 mL three-neck round bottom flask equipped with an overhead stirrer, thermometer, and rubber septa was added 19.75 g PMDA. The flask was sealed and purged with dry nitrogen for 1 hour with gentle agitation from the overhead stir shaft. To a separate 250 mL single-neck round bottom flask was added 19.75 g ODA and a magnetic stirbar. The flask was sealed and purged with dry nitrogen for 1 hour. 212 g anhydrous DMAc solvent was introduced with a double-tipped needle into the amine-containing flask with a dry nitrogen sparge and vigorous agitation. The amine solution was transferred to the dianhydride-containing flask with a double tip needle while applying slow stirring from the overhead stir shaft under a dry nitrogen blanket. The solution was allowed to react for an additional 16 hours as the dianhydride dissolved. The resultant solution is approximately 50,000 cp in viscosity at 25 degrees C. The poly(amic acid) solution was flow cast onto a 12" glass substrate, and allowed to air dry overnight in a humidity-controlled chamber to yield a film of uncured poly(amic acid). The uncured poly(amic acid) film was removed from the glass, and grommets were attached to the poly(amic acid) near the edge. The film was attached to a device of the present disclosure so that the uncured poly(amic acid) film was suspended and not in contact with a substrate. The assembly was cured in a forced air oven using a stage curing profile of 100 degrees C. (1 hour); ramp to 200 degrees C. (1 hour); hold at 200 degrees C. (1 hour); ramp to 300 degrees C. (1 hour); hold at 300 degrees C. (1 hour). The resultant film was flat, free from processing-related defects and damage associated with substrate adherence, approximately 2 mils thick, uniform thickness across the surface area, and fingernail creasable. These properties were substantially the same when measured at 0 degrees, 45 degrees, and 90 degrees radial configurations.

The methods and devices of the present disclosure successfully allowed the production of a 2 mil thick polyimide film from a homopolymer of ODA/PMDA.

EXAMPLE 11

Successful Preparation of a Thick CP1 Polyimide Film Using the Methods and Devices of the Present Disclosure This example describes the preparation of a 2 mil thick polyimide film produced from CP1 powder using the methods and devices of the present disclosure. CP1 is a NASA-designed soluble polyimide polymer that is essentially colorless and offers improved space UV-radiation resistance than most known polymer materials (including other polyimides, polyesters, Teflon, teflon-based materials, and others). Due to the nature of the polyimide formed, the composition undergoes a substantial amount of shrinkage and conformational change during processing (including, but not limited to solvent removal) which can lead to processing-related defects in the finished film, such as, but not limited to, transformation-related defects. Such processing-related defects increase in frequency as the thickness of a desired polyimide film increases. The preparation of the polyimide film of this example is provided below.

Approximately 20.0 CP1 polyimide powder was dissolved into 80.00 g diglyme (diethylene glycol dimethyl ether) with gentle agitation to form a polymer solution approximately 40,000 cp in viscosity. The CP1 solution was flow cast onto a 12" glass substrate, and allowed to air dry overnight in a humidity-controlled chamber to yield an uncured film of CP1. The uncured CP1 film was removed from the glass, and grommets were attached to the film near the edge. The film was attached to a device of the present disclosure so that the uncured polyimide film was suspended and not in contact with a substrate. The assembly was cured in a forced air oven using a stage curing profile of 100 degrees C. (1 hour); ramp to 200 degrees C. (1 hour); hold at 200 degrees C. (1 hour); ramp to 280 degrees C. (1 hour); hold at 280 degrees C. (1 hour). The resultant film was flat, free from processing-related defects and damage associated with substrate adherence, approximately 2 mils thick, uniform thickness across the surface area, and fingernail creasable. The film exhibited 315 ksi modulus, 14 ksi tensile strength, and 20% elongation at break. The film exhibited a CTE of 49.1 ppm/K. These properties were substantially the same when measured at 0 degrees, 45 degrees, and 90 degrees radial configurations.

The methods and devices of the present disclosure successfully allowed the production of a 2 mil thick polyimide film from a CP1 powder.

EXAMPLE 12

Unsuccessful Preparation of a Thick CP1 Polyimide Film Using the Methods and Devices of the of the Prior Art This example describes the preparation of a thick CP1 polyimide film from a using the methods and devices of the prior art. The polyimide solution was prepared exactly as described in Example 11 and was flow cast onto a 12" glass substrate. The polyimide solution was allowed to air dry overnight in a humidity-controlled chamber to yield a film of uncured CP1. The uncured CP1 film was secured to the glass using Kapton tape at the edges. The CP1-coated glass was cured in a forced air oven using a stage curing profile as described in Example 11. As a result of the uncured film being secured to the edges of the glass substrate, the film tore at the tape edges due to the inability of the film to release accumulated stress imparted to the film as the result of the conformational changes introduced as a result of processing (including, but not limited to, solvent removal) and formed a buckled and curled film during curing. In addition, the film thickness varied from 1 mil to 3 mils in thickness across the surface area, and the glass was spalled on approximately 10% of the surface area.

As is evident, the preparation of a thick polyimide film from a CP1 powder using the methods and devices of the prior art produces a polyimide film that is not suitable for use. However, as described in Example 11, the preparation of a thick polyimide film from a CP1 powder using the methods and devices of the present disclosure was easily accomplished and produced a polyimide film suitable for use in a wide variety of applications.

EXAMPLE 13

Successful Preparation of a Black, Thick CP1 Polyimide Film Using the Methods and Devices of the Present Disclosure This example describes the preparation of a 4 mil thick, black polyimide film produced from CP1 powder using the methods and devices of the present disclosure. Due to the nature of the polyimide formed, the composition undergoes a substantial amount of shrinkage and conformational change during processing (including, but not limited to, solvent removal) which can lead to processing-related defects in the finished film, such as, but not limited to, transformation-related defects. Such processing-related defects increase in frequency as the thickness of a desired polyimide film increases. The preparation of the polyimide film of this example is provided below.

Approximately 46.5 g CP1 polyimide powder was dissolved into 263.5 g diglyme with gentle agitation to form a polymer solution approximately 4,000 cp in viscosity. To this solution were added 5.35 g carbon black and 5.35 g dispersant aid. This formula was mixed with a media mill for 12 hours. The resultant formulation was flow cast onto a glass substrate and allowed to air dry eight hours in a humidity-controlled chamber to yield a film of uncured black CP1. The uncured black CP1 film was removed from the glass, and grommets were attached to the film near the edge. The film was attached to a device of the present disclosure so that the uncured polyimide film was suspended and not in contact with a substrate. The assembly was cured in a forced air oven using a stage curing profile of 100 degrees C. (1 hour); ramp to 200 degrees C. (1 hour); hold at 200 degrees C. (1 hour); ramp to 280 degrees C. (1 hour); hold at 280 degrees C. (1 hour). The resultant film was flat, free from processing-related defects and damage associated with substrate adherence, approximately 4 mils thick, uniform thickness across the surface area, and fingernail creasable. The film exhibited 330 ksi modulus, 15 ksi tensile strength, and 10% elongation at break. The film exhibited a CTE of 46.0 ppm/K. These properties were substantially the same when measured at 0 degrees, 45 degrees, and 90 degrees radial configurations.

The methods and devices of the present disclosure successfully allowed the production of a 4 mil thick black polyimide film from a CP1 powder.

EXAMPLE 14

Successful Preparation of a White, Thick CP1 Polyimide Film Using the Methods and Devices of the Present Disclosure This example describes the preparation of a 2 mil thick, white polyimide film produced from CP1 powder using the methods and devices of the present disclosure. Due to the nature of the polyimide formed, the composition undergoes a substantial amount of shrinkage and conformational change during processing (including, but not limited to, solvent removal) which can lead to processing-related defects in the finished film, such as, but not limited to, transformation-related defects. Such processing-related defects increase in frequency as the thickness of a desired polyimide film increases. The preparation of the polyimide film of this example is provided below.

Approximately 40.3 g CP1 polyimide powder was dissolved into 269.7 g diglyme with gentle agitation to form a polymer solution approximately 2,000 cp in viscosity. To this solution were added 40.3 g titanium dioxide powder and 4.03 g dispersant aid. This formula was mixed in a media mill for 2 hours. The resultant formulation was flow cast onto a glass substrate and allowed to air dry eight hours in a humidity-controlled chamber to yield a film of uncured white CP1. The uncured white CP1 film was removed from the glass, and grommets were attached to the film near the edge. The film was attached to a device of the present disclosure so that the uncured polyimide film was suspended and not in contact with a substrate. The assembly was cured in a forced air oven using a stage curing profile of 100 degrees C. (1 hour); ramp to 200 degrees C. (1 hour); hold at 200 degrees C. (1 hour); ramp to 280 degrees C. (1 hour); hold at 280 degrees C. (1 hour). The resultant film was flat, free from processing-related defects and damage associated with substrate adherence, approximately 2 mils thick and uniform thickness across the surface area. These properties were substantially the same when measured at 0 degrees, 45 degrees, and 90 degrees radial configurations.

The methods and devices of the present disclosure successfully allowed the production of a 2 mil thick white polyimide film from a CP1 powder.

EXAMPLE 15

Successful Preparation of a CORIN Polyimide Film Using the Methods and Devices of the Present Disclosure This example describes the preparation of a 0.8 mil thick CORIN polyimide film using the methods and devices of the present disclosure. Due to the nature of the polyimide formed, the composition undergoes a substantial amount of shrinkage and conformational change during processing (including, but not limited to, solvent removal) which can lead to processing-related defects in the finished film, such as, but not limited to, transformation-related defects. Such processing-related defects increase in frequency as the thickness of a desired polyimide film increases. The preparation of the polyimide film of this example is provided below.

Approximately 50.0 g of a colorless atomic oxygen resistant polyimide, CORIN, was dissolved into 300.0 g diglyme with gentle agitation to form a polymer solution approximately 1000 cp in viscosity. The resultant solution was flow cast onto a glass substrate and allowed to air dry eight hours in a humidity-controlled chamber to yield an uncured CORIN film. The uncured CORIN film was removed from the glass, and grommets were attached to the film near the edge. The film was attached to a device of the present disclosure so that the uncured polyimide film was suspended and not in contact with a substrate. The assembly was cured in a forced air oven using a stage curing profile of 100 degrees C. (1 hour); ramp to 200 degrees C. (1 hour); hold at 200 degrees C. (1 hour); ramp to 220 degrees C. (1 hour); hold at 220 degrees C. (1 hour). The resultant film was flat, free from processing-related defects and damage associated with substrate adherence, approximately 0.8 mils thick and uniform thickness across the surface area. The film exhibited 350 ksi modulus, 10 ksi tensile strength, and 7% elongation at break. These properties were substantially the same when measured at 0 degrees, 45 degrees, and 90 degrees radial configurations.

The methods and devices of the present disclosure successfully allowed the production of a 0.8 mil thick CORIN polyimide film.

EXAMPLE 16

Unsuccessful Preparation of a CORIN Polyimide Film Using the Methods and Devices of the Prior Art This example describes the preparation of CORIN polyimide film from a using the methods and devices of the prior art. The polyimide solution was prepared exactly as described in Example 15 and was flow cast onto a glass substrate pretreated with a releasing agent, and allowed to air dry eight hours in a humidity-controlled chamber to yield an uncured CORIN film. The uncured CORIN film was secured to the glass using Kapton tape at the edges. The CORIN-coated glass was cured in a forced air oven using a stage curing profile as described in Example 15. The film was soaked in deionized water for one week, but did not release from the glass.

As is evident, the preparation of a CORIN polyimide film using the methods and devices of the prior art produces a polyimide film that is not releasable from the glass substrate and is therefore not suitable for use. However, as described in Example 15, the preparation of a CORIN polyimide film using the methods and devices of the present disclosure was easily accomplished and produced a polyimide film suitable for use in a wide variety of applications.

The foregoing description illustrates and describes the devices and other teachings of the present disclosure. Additionally, the disclosure shows and describes only certain embodiments of the devices and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain best modes known of practicing the teachings of the present disclosure and to enable others skilled in the art to utilize the teachings of the present disclosure in such, or other, embodiments and with the various modifications required by the particular applications or uses. Accordingly, the teachings of the present disclosure are not intended to limit the exact embodiments and examples disclosed herein. All references cited herein are incorporated by reference as if fully set forth in this disclosure.

What is claimed:

1. A suspension device for suspending the polyimide or polyamic acid workpiece during processing so as to reduce or eliminate processing-related defects comprising:
   (a) at least one support element, the support element further comprising a receiving point;
   (b) a plurality of attachment elements, said plurality of attachment elements being secured to the receiving point at a first end and to the workpiece at a second end wherein the attachment elements are constant tension springs;
   (c) a polyimide or polyamic acid workpiece comprising a plurality of attachment points, each said attachment point comprising an opening and a reinforcing structure, wherein the attachment elements are secured to the workpiece at the attachment points; and
   wherein such processing results in shrinkage of the workpiece.

2. The device of claim 1 where the attachment elements are reversibly secured to the workpiece, the support element or both the workpiece and the support element.

3. The device of claim 1 where a single support element secures 1 attachment element.

4. The device of claim 1 where a single support element secures more than 1 attachment element.

5. The device of claim 1 where the support element further comprises an extension portion, the extension portion having at least one arm.

6. The device of claim 1 where a single support element secures more than 1 attachment element.

7. The device of claim 1 where said support element further comprises a base secured to the at least one support element.

8. The device of claim 1 where the suspension device further comprises a base, the base comprising at least one attachment point for receiving the at least one support element.

9. The device of claim 8 where the support elements are reversibly received by the attachment points.

10. The device of claim 1 where the processing-related defect renders the workpiece unsuitable for use.

11. The device of claim 1 where the processing is imidization.

12. The device of claim 11 where the processing-related defects are transformation-related defects or substrate retention-related defects.

13. The device of claim 12 where the transformation-related defect is a cracking, a tearing, a curling, a warping, or a mechanical anisotropy of the workpiece.

14. The device of claim 12 where the substrate-retention related defect is a cracking of the workpiece, a tearing of the workpiece, an inability to remove the workpiece from the substrate, or a defect associated with the use of an ancillary agent used to aid in the removal of the workpiece from the substrate.

15. The device of claim 14 where the ancillary agent is a release interface agent and the defect associated with the use of an ancillary agent is a haziness, a cloudiness, or a product deformation.

16. The device of claim 1 where the workpiece is in the form of a film or membrane.

17. The device of claim 1 where the suspending dissipates at least a portion of a stress that is generated during processing.

18. The device of claim 11 where the suspending dissipates at least a portion of a stress that is generated during imidization.

19. The device of claim 1 where the at least one support element has a length, l, and the attachment elements have a length, L, such that the workpiece is suspended during processing.

20. The device of claim 1 where the device is operated in a continuous mode or a batch mode.

21. The device of claim 1 wherein the plurality of attachment elements are secured to the workpiece.

22. The device of claim 1 wherein the plurality of attachment elements are spiral-coiled-type constant tension springs.

* * * * *